Patented Feb. 11, 1947

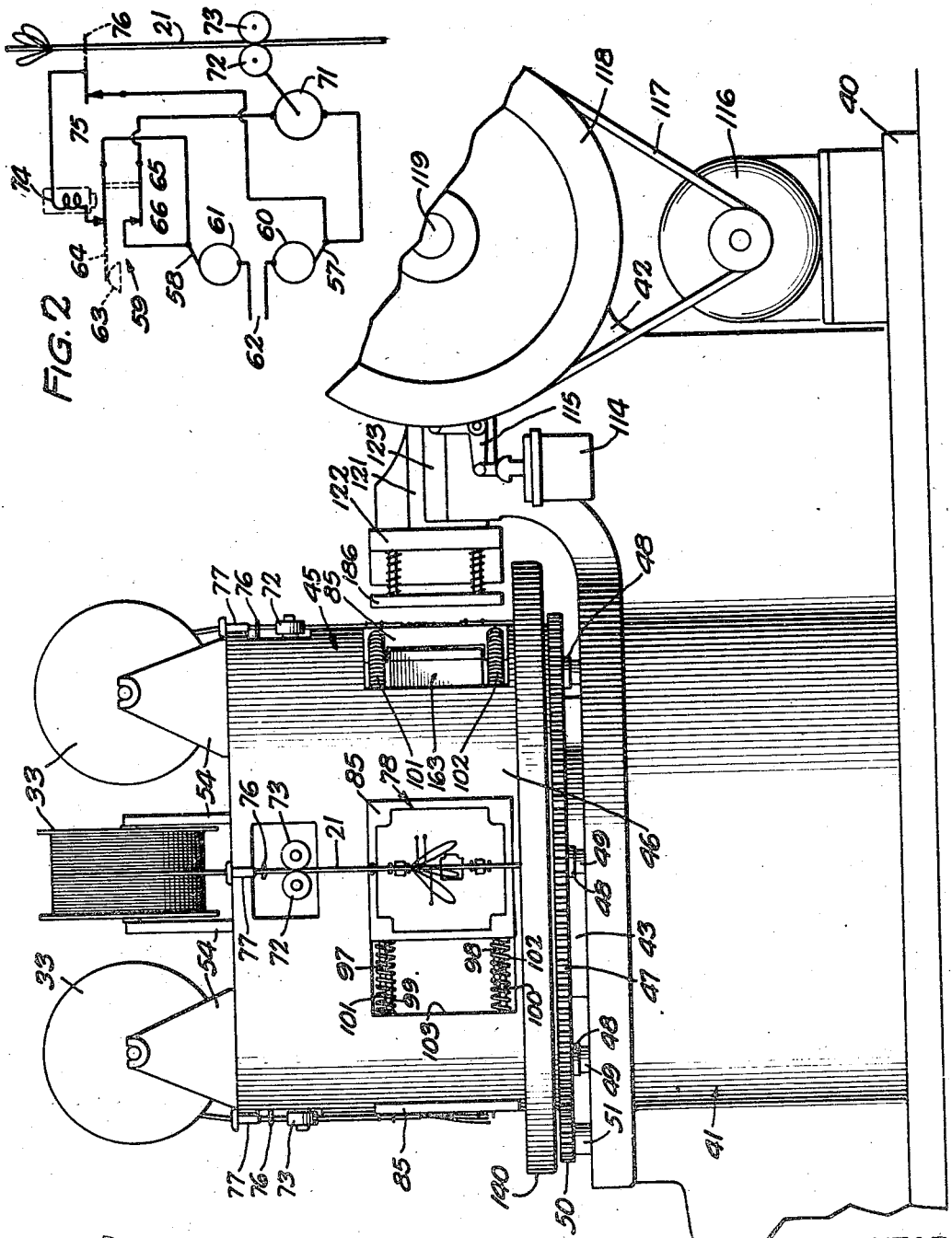

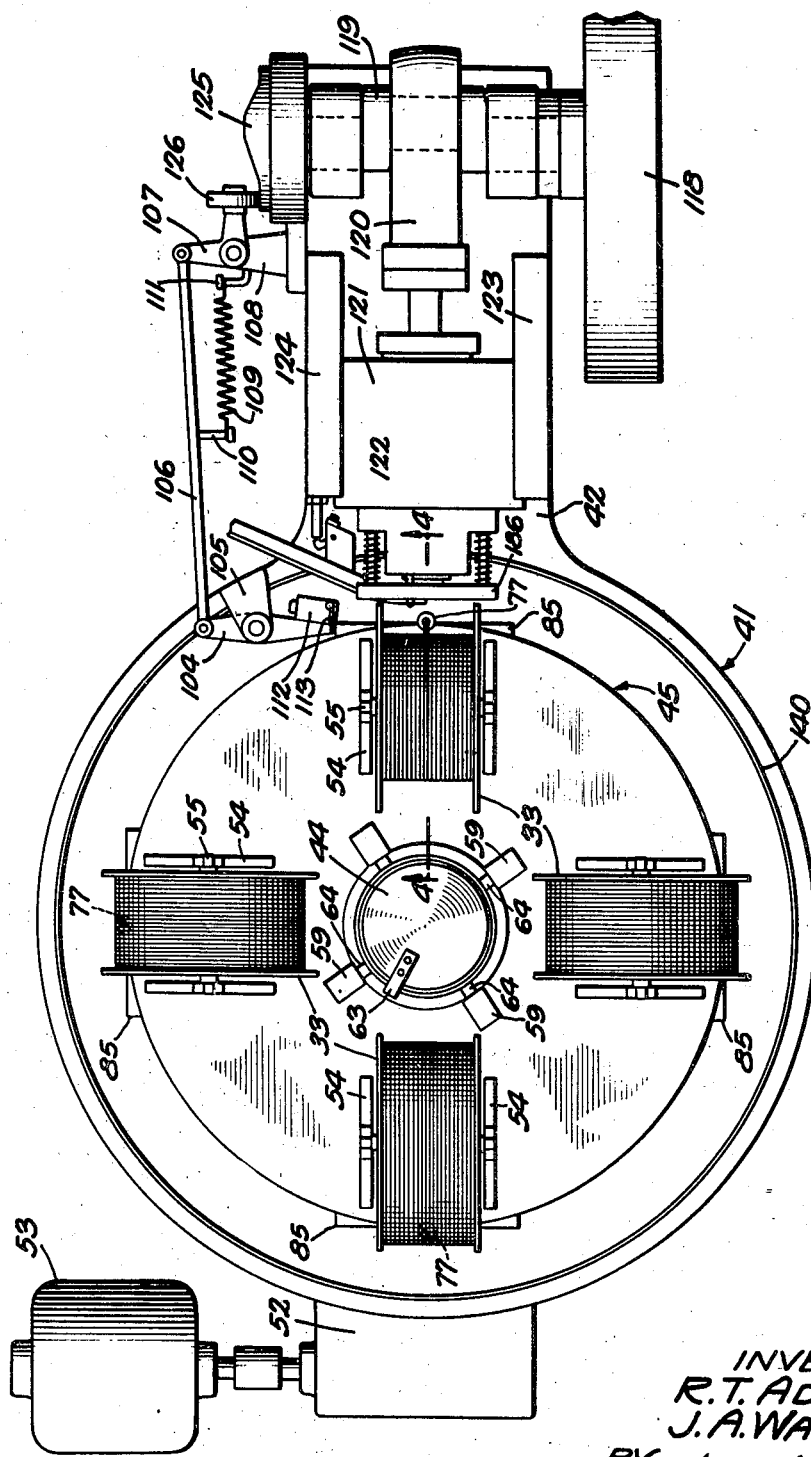

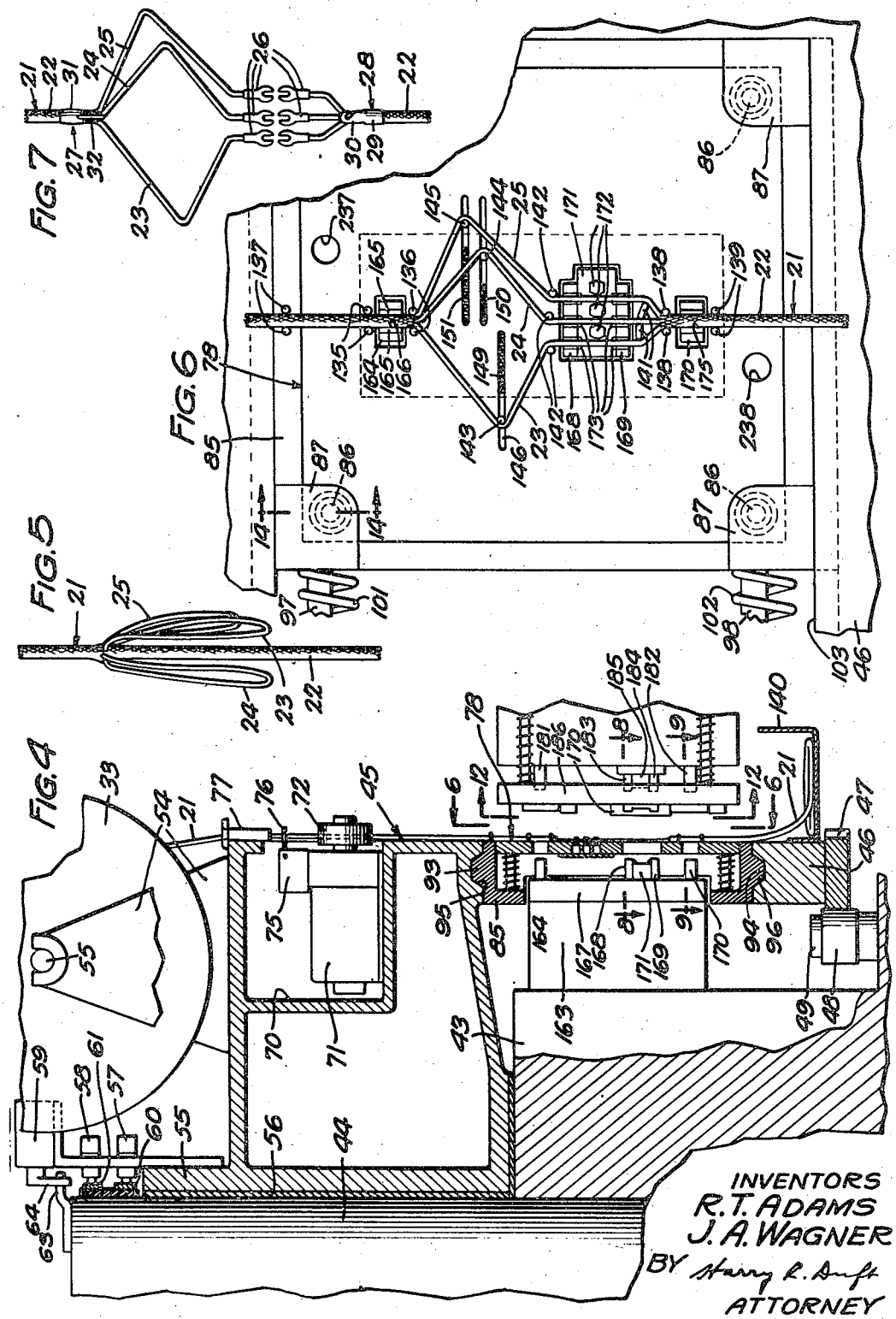

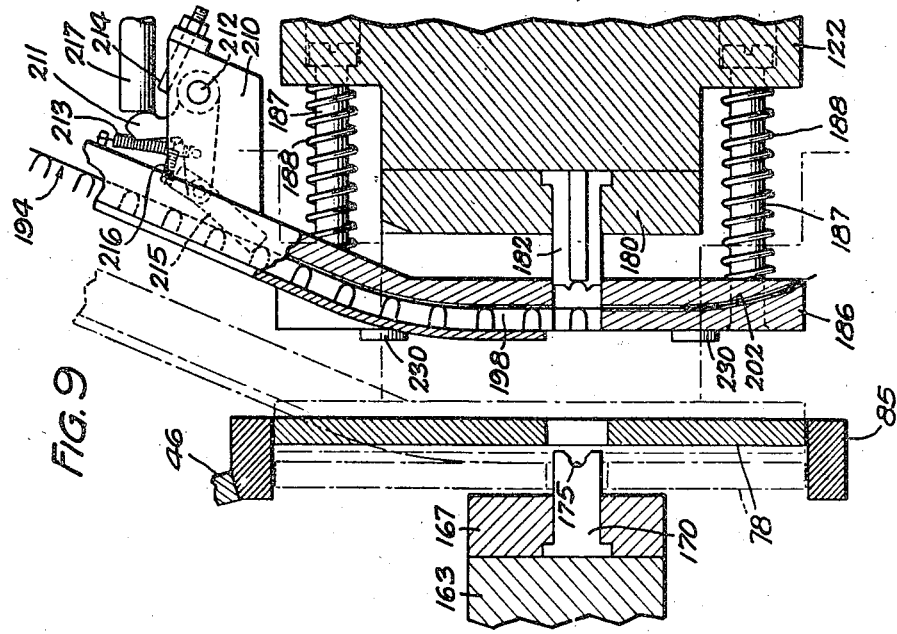
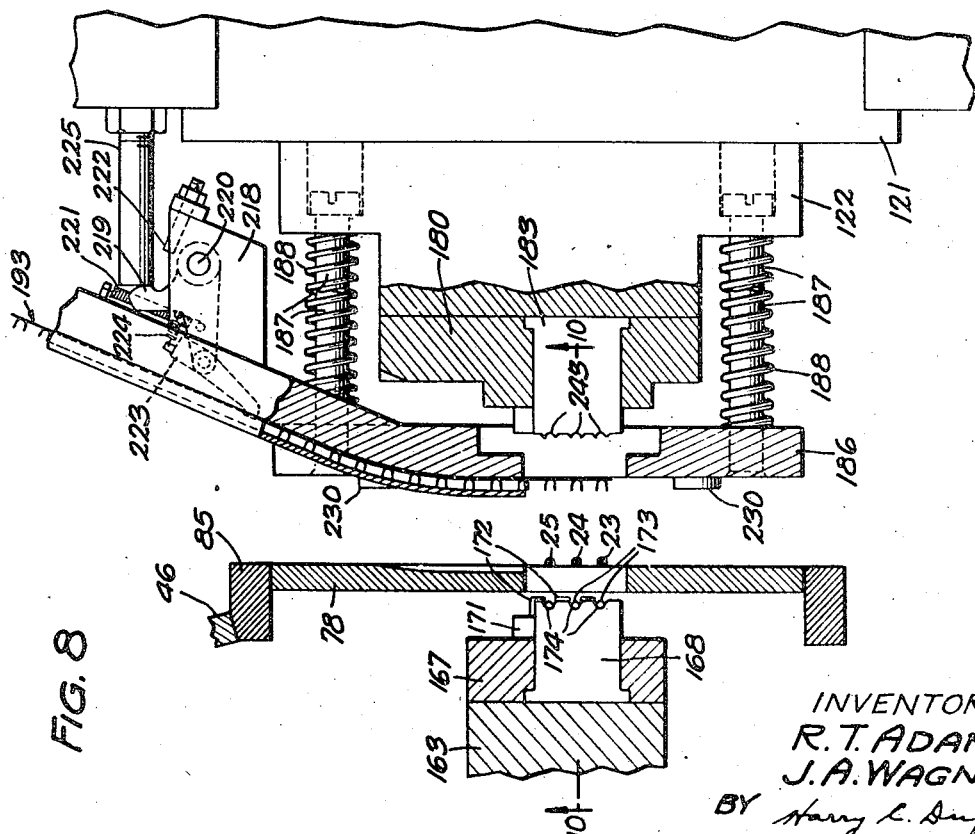

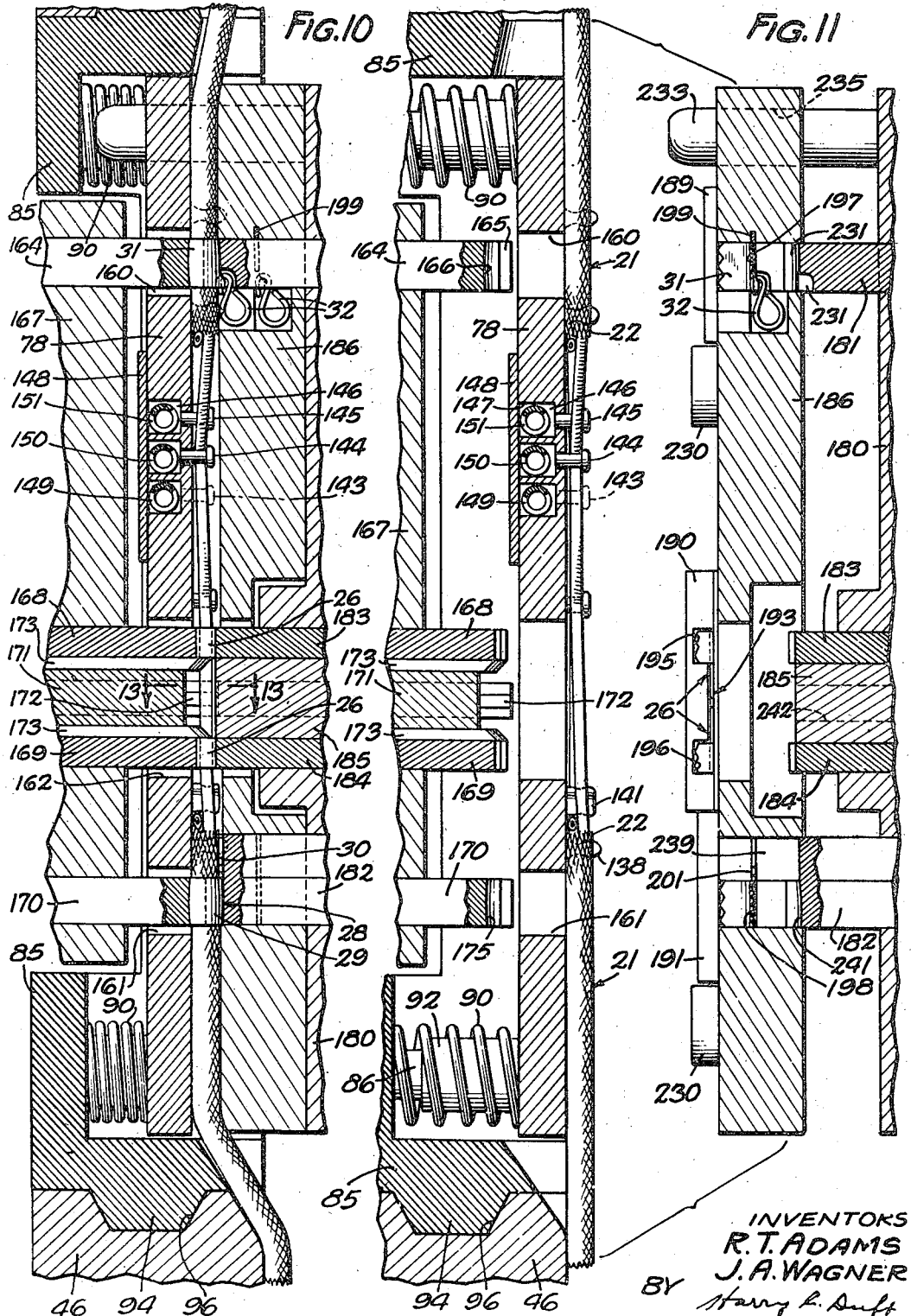

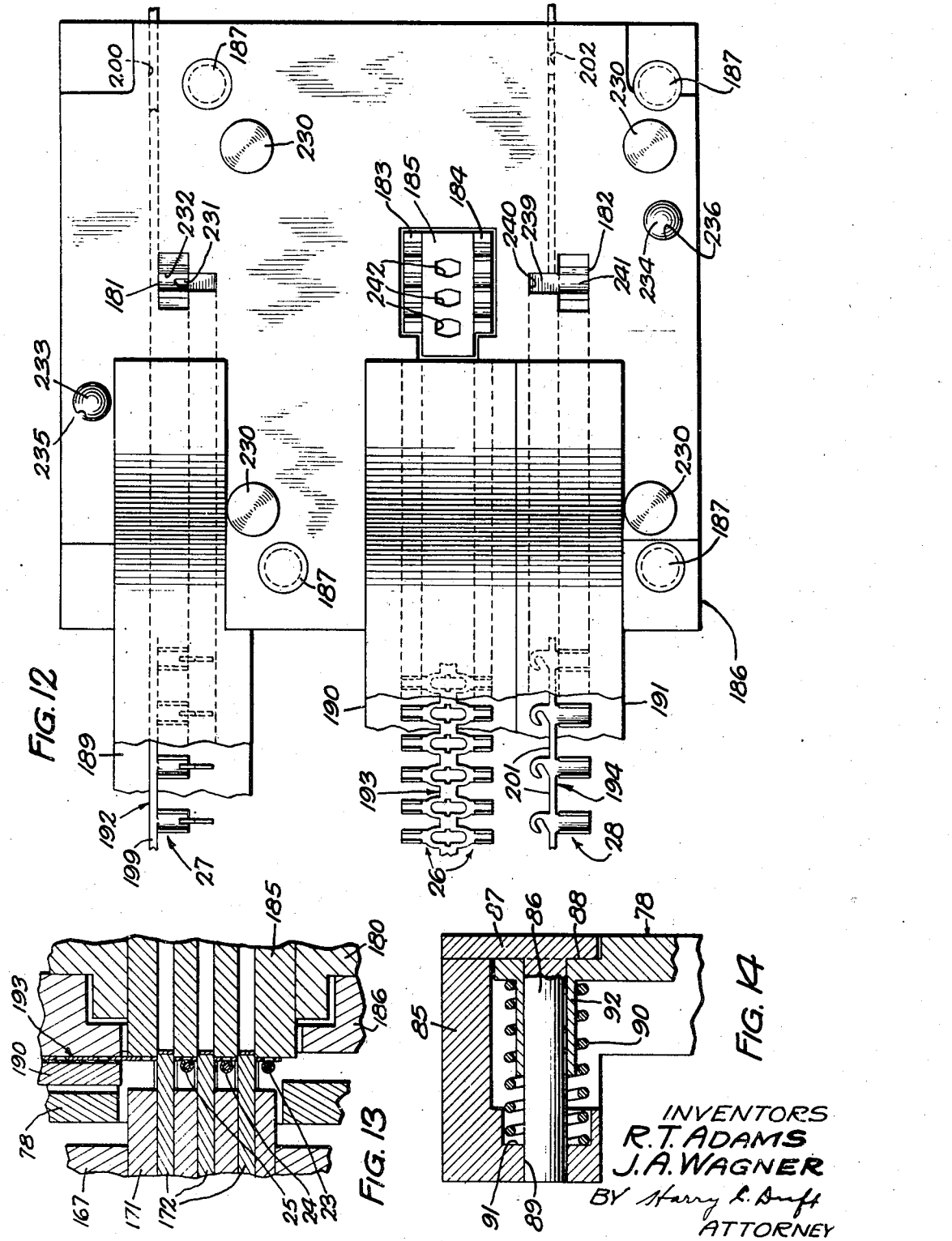

2,415,399

UNITED STATES PATENT OFFICE 2,415,399

CORD MANUFACTURING APPARATUS

Robert T. Adams, Baltimore, Md., and Julius A. Wagner, Cleveland Heights, Ohio, assignors to Western Electric Company, Incorporated, New York, N. Y., a corporation of New York Application January 11, 1945, Serial No. 572,415

9 Claims. (Cl. 28—1)

This invention relates to cord manufacturing apparatus and more particularly to an apparatus for attaching metallic elements to the individually insulated conductors of multi-conductor cordage.

It is an object of the present invention to provide a simple and efficient apparatus for rapidly forming articles.

In accordance with one embodiment of the invention, a plurality of supply reels containing braid covered cordage from which the individual conductors have been thrown out through the braid covering at intervals are supported on top of a rotatable turret carrying cordage positioning plates, in substatntial alignment with the reels, on which the individual conductors may be arranged to receive terminal members and to be cut apart between the terminal members simultaneously with the attachment to the cordage of metallic binding elements. Feeding devices individual to each associated reel and plate are provided for feeding a length of cardoge equal to the distance between the points where the conductors are thrown out through the covering, thus to supply a length of cordage to each of the plates for each rotation of the turret. The metallic elements comprising the terminal members and binding elements are attached to the conductors and cordage by means of a punch press operating in synchronism with the turret and having a part of its tools mounted inside of the turret.

A complete understanding of the invention may be had by reference to the following detailed description when considered in conjunction with the accompanying drawings, wherein Fig. 1 is a side elevational view of a cord manufacturing apparatus embodying the present invention;

Fig. 2 is a circuit diagram of the circuit connections and control switches for controlling the motors which withdraw the cordage from the reels and direct it to the cordage supporting plates;

Fig. 3 is a plan view of the mechanism shown in side elevation in Fig. 1;

Fig. 4 is an irregular vertical sectional view taken substantially along the line 4—4 of Fig. 3 in the direction of the arrows showing details of construction of the mechanism for feeding the cordage from a reel to a plate;

Fig. 5 is a fragmentary detail view showing the cordage with the individually insulated conductors thrown out through its braid covering;

Fig. 6 is an enlarged fragmentary view in elevation of one of the cordage supporting plates taken substatntially along the line 6—6 of Fig. 4 in the direction of the arrows and showing cordage on the plate after the braid covering has been severed and the cordage and the individually insulated conductors have been properly positioned on the plate;

Fig. 7 is a fragmentary detail view of the opposite ends of two cords formed in the apparatus disposed as they are after the punch press mechanism has attached the terminals and binding elements to the cordage;

Fig. 8 is a horizontal sectional view taken substantially along the line 8—8 of Fig. 4 in the direction of the arrows showing some details of a mechanism for feeding terminal members to the punch press and showing some of the details in the punch press portion of the apparatus;

Fig. 9 is a horizontal sectional view taken substantially along the line 9—9 of Fig. 4 in the direction of the arrows showing a portion of a mechanism for feeding binding elements, which comprise stay bands, into the punch press portion of the apparatus and also showing some details of the tools for attaching the stay bands to the cordage;

Figs. 10 and 11 are fragmentary sectional views on an enlarged scale and taken substantially along the line 10—10 of Fig. 8 in the direction of the arrows, Fig. 10 showing the apparatus in its operated position and Fig. 11 showing the apparatus in the position it occupies just prior to the initiation of a cycle of operation of the punch press;

Fig. 12 is a view taken substantially along the line 12—12 of Fig. 4 in the direction of the arrows showing the tools on the movable head of the punch press and their associated mechanisms in elevation;

Fig. 13 is a fragmentary horizontal sectional view taken substtantially along the line 13—13 of Fig. 10 in the direction of the arrows showing some details of the tools for attaching the terminal members to the conductors; and Fig. 14 is a fragmentary vertical sectional view taken substantially along the line 14—14 of Fig. 6 in the direction of the arrows showing some details of the mechanism which support the cordage supporting plate.

In the drawings, like reference characters designate the same parts throughout the several views, and particular reference will be first had to Figs. 5 and 7, wherein the cordage is shown before and after the terminal members and binding elements are attached to it. As shown in Fig. 5, cordage 21 to be handled in the apparatus is formed with a braid covering 22, which encloses three individually insulated conductors 23, 24 and 25 throughout most of its length, but through which the conductors are looped at intervals, as shown in Fig. 5. In the apparatus of the present invention, the cordage is fed to position to have two oppositely disposed terminal members 26 (Fig. 7) attached to each conductor and to have the conductors severed intermediate the points of attachment thereto of the terminal members. In addition to the operation of attaching the terminal members to the conductors and cutting the conductors between the terminal members, a pair of retaining bands in the form of an S-hook 27 and a stay band 28 are attached to the cordage at the point where the braid covering of the cordage has been severed in such manner that the S-hook 27 and stay band 28 will prevent fraying of the braid covering 22 and will provide means for supporting the cord in electrical apparatus, for which it is designed. The stay band, as seen most clearly in Fig. 7, has a sleeve portion 29 tightly engaging the cordage and has a hooked portion 30 formed integrally with the sleeve 29 and adapted to be used in attaching the cordage to the electrical apparatus in such a manner that strain will not be applied to the terminal members 26. The S-hook, on the other hand, is provided with a sleeve portion 31, which tightly engages the cordage to prevent unravelling and which has loosely hung thereupon an S-shaped hook 32. The cordage as shown in Fig. 5 is prepared in any suitable braiding machine and is wound upon reels 33 to prepare the cordage for further processing in the apparatus of the present invention.

The apparatus for handling the cordage and completing the formation of the cords, as shown in Fig. 7, is mounted upon a main base 40 (Figs. 1 and 3), on which there are mounted a turret supporting casting 41 and a punch press standard 42. The turret supporting casting has extending upwardly from it a main bearing block 43 (Fig. 4), from which extends a main bearing post 44. The post 44 and the upper surface of the block 43 serve as bearings for rotatably supporting a turret 45, which comprises a relatively large annular casting having an apron portion 46 suspended from it, as seen most clearly in Figs. 1 and 4. Attached to the lower end of the apron portion 46 of the turret 45 is a ring gear 47, the inner surface of which is guided by a plurality of rollers 48 freely rotatable on stud shafts 49 extending vertically from the main body of the turret supporting casting 41. The ring gear 47, as shown in Fig. 1, meshes with a pinion 50 mounted upon a shaft 51 suitably journalled in the turret supporting casting 41 and driven by a suitable gearing (not shown) to which motion is imparted through a gear reducer 52 from a motor 53 (Fig. 3). When power is supplied to the motor 53, it will, through the gear reducer 52, shaft 51 and pinion 50, impart rotation to the ring gear 47 and turret 45.

The upper surface of the turret 45, as shown most clearly in Figs. 3 and 4, has mounted upon it four sets of reel stands 54—54 adapted to receive shafts 55 for supporting the reels 33. The turret 45 has formed integrally with it a bearing sleeve 55, which engages a bearing 56 on the main bearing post 44 and the sleeve 55 extends slightly above the main body of the turret 45 to support a plurality of brush assemblies 57—57 and 58—58, and a plurality of switches 59, there being one set of brushes 57 and 58 and one switch 59 provided for each reel 33. The brush assemblies 57 and 58 (Figs. 2, 3 and 4) engage fixed commutator rings 60 and 61 insulatedly mounted upon the bearing post 44 and connected to a source of current 62. Also mounted upon the bearing post 44 is a fixed abutment member 63, which is positioned in the path of movement of the switch actuator arms 64 individual to each of the switches 59.

From the foregoing, it is believed to be apparent that, each time, in the rotation of the turret 45, that the switch actuator arm 64 engages an abutment member 63, the switch 59 associated with that actuator arm will momentarily be operated. Each of the switches 59 is of the same construction and has a pair of interconnected movable contacts 65 and 66, the purpose of which will be described more in detail hereinafter.

The turret 45 has four identically formed nests 70 formed in it directly beneath the reels 33 carried by the reel stands 54 and in each of these nests there is mounted a motor 71. The motor 71 may be supplied with power from the current source 62 to drive a pair of feed rolls 72 and 73 upon operation of the switch 59. Since the switch 59 is only operated momentarily by the coaction of its actuator arm 64 and the abutment 63, a holding relay 74 is provided for maintaining the circuit to the motor 60 until a sufficient length of cordage 21 has been fed by the motor 71. The circuit to the relay 74 is completed through the movable contact 65, which will be locked operated upon energization of the relay 74 through a normally closed switch 75 and will maintain the circuit to the motor 71 until the switch 75 is opened. The switch 75 is mounted in the nest 70 and carries a forked actuator arm 76 in position to be engaged by the conductors 23, 24 and 25 at the point where they are thrown out through the braid covering 42 of the cordage 21. The cordage throughout that portion of its length where the conductors are enclosed in the braid cover 22 will pass through the forked actuator arm without actuating it, being guided thereto by a guide member 77. However, as soon as the conductors extending through the braid covering reach the point where they engage the actuator arm 76, the actuator arm 76 will be operated and will open the switch 75. As soon as the switch 75 opens, the relay 74 will be deenergized and the circuit to the motor 71, through movable contact 66, will be broken. The motor will continue to feed cordage for a short length of time after switch 75 opens due to its overrun and the loops of conductors 23, 24 and 25, which trip the actuator arm 76, will be fed down past the feed rolls 72 and 73 to a position in alignment with a cord supporting plate designated generally by the numeral 78.

There are four of the cord supporting plates 78 positioned about the turret 45 and since all of the plates are of exactly the same construction, only one of them need be described in detail. Each plate 78 is carried by a rectangular framework 85, on which the plate is mounted for a limited amount of horizontal movement. A set of four posts 86 are fixed to the rectangular framework 85 in a manner shown most clearly in Fig. 14, each of the posts being suitably attached to a corner plate 87, which extends out over the cord supporting plate 78, and the cord supporting plate being notched, as shown at 88, so that the outer surface of the plates 78 and 87 will normally be flush one with the other. The post 86 is mounted at its rear end in an aperture 89 formed in part of the framework 85 and is surrounded by a compression spring 90, which bears against the inner surface of the plate 78 and nests in a socket 91 formed in the framework 85. A sleeve or collar 92 formed on the plate 78 and surrounding the post 86 limits the amount of movement of the plate 78 to the left (Fig. 14) with respect to the framework 87 when the spring 90 is compressed.

The frameworks 85 have tongues 93 and 94 (Fig. 4) formed on their top and bottom edges and extending along an arc of a circle to register with grooves 95 and 96 formed in the apron portion 46 of the turret 45, thus to permit sliding of the framework 85 with respect to the turret to a limited extent. A pair of cooperating arcuately shaped rods 97 and 98 fixed to the framework 85 cooperate with a pair of similarly shaped rods 99 and 100 to support a pair of compression springs 101 and 102 between the left edge of a cutout 103 in the apron 46 and the right edge of the framework 85 (Fig. 1), whereby the framework 85 and plate 78 supported thereby are normally urged to assume the position shown in Fig. 1. The framework 85 has its outer face extending tangentially of the circumference of the turret apron 46 and consequently carries its forward edge (the turret rotates counterclockwise) in position to be engaged by a stop lever 104 (Fig. 3). The stop lever 104 is pivoted on a bracket 105 and is interconnected by means of a link 106 to a bell crank lever 107, in turn pivoted upon a bracket 108 mounted on the press standard 42. The lever 104 is normally urged to rock to the position shown in Fig. 3 by a contractile spring 109 attached to a pin 110 on the link 106 and to a bent pin 111 fixed to the bracket 108.

Suitably mounted upon the lever 104 (Fig. 3) is a switch 112, which carries its actuator arm 113 in the path of the forward edge of the framework 85, whereby, at the time that the framework 85 engages the stop lever 104, the switch 112 will be closed to supply current to the clutch trip solenoid 114 (Fig. 1) in the punch press. The clutch trip solenoid 114, upon energization, will impart an oscillation to a bell crank lever 115 connected to any suitable clutch tripping mechanism (not shown) to initiate a single cycle of operation of the punch press. The punch press is adapted to be driven by a motor 116 mounted upon the main base 40 and driving a driving element 117, which, in turn, drives a fly wheel 118. The fly wheel 118 is suitably journalled on the punch press standard 42 and, upon operation of the clutch trip solenoid 114, will drive an eccentric 119 through one complete cycle of rotation.

As is usual in such structures, the eccentric 119 drives a pitman 120 connected to a cross head 121 slidable in ways 123 and 124 (Fig. 3). The cross head 121 carries a tool supporting block 122, which, in turn, carries tools for operating upon the cordage which has been positioned on the cord supporting plate 78. The eccentric shaft 119 of the punch press has a cam 125 mounted on it for cooperation with a cam roller 126 carried by the bell crank lever 107, whereby, as the punch press nears the end of its cycle of operation, the cam 125 will cause actuation of the bell crank lever 107 to move the lever 104 out of the path of the framework 85, whereupon the springs 101 and 102 will move the framework 85 back to its normal position at the completion of the punch press cycle.

All of the cord supporting plates 78 are of exactly the same construction, as pointed out hereinbefore, and each of them is provided with mechanism for properly supporting the individual conductors 23, 24 and 25 and the cordage 21 in position to have the terminals 26, stay bands 28 and S-hooks 27 attached to them in the punch press. As shown most clearly in Figs. 6, 10 and 11, the plate 78 is provided with cordage locating pins for positioning the cordage to be operated upon by the tools of the punch press and it will be understood that after cordage has been fed by the feed rollers 72 and 73 down into position where the conductors 23, 24 and 25 looped out through the braid cover 22 are approximately in alignment with the center of the plate 78, the braid cover on the cord may be severed in any suitable manner and the cordage and conductors may be placed on the plate 78, as shown in Fig. 6, wherein stationary locating pins 135—135 and 136—136 on the plate 78 are in alignment with similar pins 137—137 on the framework 85 and the cordage may be placed between these pairs of pins with the severed end of the braid covering 22 adjacent pins 136. Similarly, the lower end of the braid covering 22 on the cordage should be placed between stationary locating pins 138, which are aligned with stationary locating pins 139 for positioning the cordage. The lower end of the cordage 21 may extend down into an annular pan or trough 140 mounted on the apron 46, as shown most clearly in section in Fig. 4. After the cordage has been positioned between the sets of pins 135 to 139, inclusive, the individually insulated conductors 23, 24 and 25 may be threaded, as shown in Fig. 6, to engage stationary pins 141—141, 142—142 and to engage movable pins 143, 144 and 145, respectively. The pins 143, 144 and 145 are mounted upon blocks slidable in grooves in the plate 78 and since all of the blocks are of exactly the same construction, only block 146 supporting the pin 145 will be described in detail. The block 146, as shown most clearly in Fig. 11, is slidable in a groove 147 formed in the plate 78 and is held in place in the groove 147 by a retainer plate 148, which is common to all of the blocks supporting the pins 143, 144 and 145. The block 146, which supports the pin 143, is urged to the left (Fig. 6) by a compression spring 149 seated in the groove 147 and the blocks 146 supporting the pins 144 and 145 are urged to the right (Fig. 6) by compression springs 150 and 151, whereby any slight inequality in the length of the conductors 23, 24 and 25 extending between the severed ends of the braid cover 22 will be compensated for.

The cooperating pins on the cord supporting plate 78 serve to support the cordage and individually insulated conductors in position to be operated upon by tools forming a part of the punch press mechanism to carry the cordage in position in alignment with tool receiving apertures 160 and 161 and to carry the individually insulated conductors in alignment with a tool receiving aperture 162 in the plate 78. The tools which pass through the just-mentioned apertures to attach the metallic elements to the cordage and conductors are supported by the main bearing block 43 (Fig. 4), on which there is mounted a tool supporting block 163, on which there is mounted a forming tool 164 for forming the sleeve portion 31 of an S-hook 27 into clamping engagement with the cordage 21. As shown most clearly in Figs. 6 and 11, the S-hook forming tool 164 has flared surfaces 165—165, which will guide the partially formed sleeve portion 31 of the S-hook into a rounded forming notch 166. The forming tool 164 is held on the tool supporting block 163 by means of a tool holder 167, which also serves to hold terminal forming tools 168 and 169 and a stay band forming tool 170 on the block 163. Interposed between the terminal forming tools 168 and 169 is a nest 171 for supporting three punches 172—172 and six conductor cutting tools 173. Each of the terminal forming tools 168 and 169 has three forming notches 174, as shown most clearly in Fig. 8, for forming the sleeve portions of the terminal members 26 into gripping engagement with the conductors 23, 24 and 25. Similarly, the stay band forming tool 170 has a forming notch 175 formed in it, which is of substantially the same construction as the forming notch formed in the S-hook forming tool 164.

In their normal inoperative positions, as shown in Figs. 4, 8, 9 and 11, the just described tools are positioned behind the cord supporting plate 78 and are in alignment with the tool receiving apertures 160, 161 and 162 associated with them so that when the springs 90 are compressed, as will be described hereinafter, the plate 78, in moving to the left (Fig. 11) will carry the cordage and individual conductors into position in alignment with the tools. The tool supporting block 122 carries tools for cooperation with those just described, the tools being held on the block 122 by a tool holder 180, in which the various tools are nested. These tools comprise an S-hook forming tool 181, a stay band forming tool 182, terminal member forming tools 183 and 184 and a die member 185. In addition to carrying the just-described tools, the tool supporting block 122 carries a stripper plate 186, which is supported on four support bolts 187—187 slidably mounted in the block 122 and fixed at their lefthand ends (Figs. 8 and 9) to the stripper plate 186. The plate 186 is normally urged to assume the position shown in Figs. 8 and 9 by compression springs 188—188 interposed between a surface of the block 122 and the plate 186 and surrounding the support bolts 187.

The stripper plate 186, as shown most clearly in Figs. 8 to 12, inclusive, has guide plates 189, 190 and 191 suitably fixed to it for cooperating with surfaces of the plate 186 to guide interconnected strips 192, 193 and 194 of S-hooks 27, terminal members 26 and stay bands 28, respectively. The guide plate 190 has grooves 195 and 196 formed in it for receiving the partially formed sleeves of the terminal members 26, whereas the plates 189 and 191 serve to hold the interconnected strips 192 and 194 of S-hooks and stay bands in grooves 197 and 198 formed in the plate 186. The interconnected strips of S-hooks 192 are interconnected by a continuous web 199 (Fig. 12), from which the S-hooks are sheared in the operation of the press and which is fed out of the press through a passageway 200 after the S-hooks are sheared from it. The stay bands as fed into the press are interconnected by short webs 201, which extend between portions of the stay bands and which are sheared between adjoining stay bands in the operation of the press and will be forced out of the plate 186 through a passageway 202 by succeeding webs engaging them as the interconnected strip 194 is fed into the press.

Since, in each operation of the press, six terminal members 26 are sheared from the interconnected strip 193 by the co-action of the punches 172 with their associated die 185, the scrap from this strip of metallic members is pushed out through the die 185.

In order to feed the interconnected strips 192, 193 and 194 into the apparatus, intermittently operated feeding devices are provided which operate on the return stroke of the press to feed the three strips into position in the press. The mechanism for feeding the S-hooks and stay bands are of exactly the same construction and, accordingly, only one of them, that is, the stay band feeding apparatus, has been shown in detail. This mechanism comprises a bracket 210 mounted on plate 186 and having pivoted thereto a bell crank lever 211 oscillatable about a pin 212. The bell crank lever 211 is normally urged to rock clockwise about the pin 212 by a contractile spring 213 and its movement under the influence of the spring 213 is limited by an adjustable stop member 214 adjustably fixed on the bracket 210. The bell crank lever 211 has a feed lever 215 pivoted on it and urged to engage the interconnected strip 194 of stay bands by a contractile spring 216. When the cross head 121 of the press is moved to the left (Fig. 9), the spring 213 will rock the bell crank lever 211 clockwise, thus to shift the feed lever 215 into engagement with a succeeding one of the S-hooks in the strip 194 and movement of the bell crank 211 will be limited by the stop member 214. On the retraction of the tool supporting block 122 to the right (Fig. 9), an arm of the bell crank 211 will engage a fixed abutment 217 to rock the bell crank 211 counterclockwise and feed one stay band forward to position to be operated upon by its forming tools.

The mechanism for feeding the S-hooks is exactly the same as that described for feeding the stay bands and the mechanism for feeding the terminal members is substantially the same except the mechanism for feeding the terminal members feeds six terminal members comprising three pairs of them into position to be operated upon by the tools of the press upon each stroke of the press. The mechanism for feeding the terminal members comprises a bracket 218 having a bell crank 219 oscillatably mounted thereon by means of a pin 220 and urged by a spring 221 to rock clockwise into engagement with a stop member 222. The bell crank lever 219 has a feed lever 223 pivoted on it and urged to rock clockwise by a contractile spring 224 and operable to feed six terminal members 26 in position to be operated upon by the tools by the engagement of the bell crank lever 219 with a fixed abutment 225. This mechanism operates in the same manner as the mechanism for feeding the stay bands except the stroke is slightly longer so that it will feed six terminal members 26 into association with the tools for each stroke of the press.

In addition to supporting the mechanism for feeding the interconnected strips of S-hooks, stay bands and terminal members to position to be operated upon by the tools of the punch press, the plate 186 carries four bumper pads 230, which, in the operation of the apparatus, are adapted to engage the plate 78 and move it from the position shown in Fig. 11 to the position shown in Fig. 10 after the S-hooks 27 and stay bands 28 have been sheared from their interconnecting webs 199 and 201, respectively, and transferred from their guide slots onto the cordage 21. Therefore, the springs 90 are made substantially stronger than the springs 188 so that as the tool supporting block 122 moves to the left (Figs. 8, 9, 10 and 11), the bumper pads 230 will be carried into engagement with the plate 78 to lightly engage the surface of the stripper plate 186 with the cordage 21. As the tool supporting block 122 continues to move to the left, the springs 90 being stronger than the springs 188, the plate 78 will remain stationary while the springs 188 are compressed slightly. During this compression of the springs 188, the upper edge of the S-hook forming tool 181 (Figs. 10 and 11) will shear an S-hook from the web 199 and will transfer it from the interconnected strip 192 into engagement with the cordage 21. Therefore, the upper edge of the forming tool 181 cooperates with the plate 186 to shear the S-hook 27 from its strip 192. The tool 181 is cut away as shown at 231 (Figs. 11 and 12) to receive the S-shaped hook 32 and has a forming notch 232 formed therein for cooperating with the forming notch 166 of the forming tool 164 for forming the sleeve portion 31 of the S-hook into clamping engagement with the cordage 21. This forming operation, however, does not take place until the springs 90 are being compressed and in order to insure that the tools 181 and 164 are properly aligned, liner pins 233 and 234 are mounted upon the tool supporting block 122 and extend through apertures 235 and 236 in the plate 186 and into apertures 237 and 238 formed in the cord supporting plate 78.

Since the short webs 201 which interconnect the stay bands extend between portions of the stay bands rather than along an edge thereof, the stay band forming tool 182 is provided with a shearing portion 239 (Figs. 11 and 12), which cooperates with an edge of a slot 240 formed in the plate 186 to shear the stay bands from their interconnected strip 194. The tool 182 is further provided with a rounded forming notch 241 adapted to cooperate with the notch 175 in the forming tool 170 after the stay bands have been sheared from their strip 194 and transferred by the tool 182 into engagement with the cordage 21. The forming operation of cooperating tools 170 and 182 takes place during the compression of the springs 90, toward the end of the movement of the tool supporting block 122, to the left (Figs. 10 and 11).

The shearing of the terminal members 26 from their interconnected strip 193 is effected by the punches 172 in cooperation with the die 185, which, as shown most clearly in Fig. 12, is provided with three die apertures 242 in alignment with the punches 172. In the operation of the terminal forming tools, the sleeve portions of the terminal members 26 are engaged with the individually insulated conductors 23, 24 and 25 and the forming tools 183 and 184 move forward to engage the forming notches 243 formed on the tools 183 with the strip of terminal members and as the springs 90 are compressed, the forming tools 168 and 183 and 169 and 184 will form the sleeves of the terminal members 26 into gripping engagement with the conductors 23, 24 and 25 at substantially the same time that the punches 172 shear the terminal members from their interconnected strip 193. As the terminal members are sheared from the strip 193, the conductor cutting tools 173 will engage the conductors and shear them against the terminal members, which are held by the flat face of the die member 185.

In the operation of the apparatus, interconnected strips of S-hooks, terminal members and stay bands 192, 193 and 194 are positioned on the stripper plate 186 and cooperating guide members 189, 190 and 191 in position to be fed by their respective feeding devices upon reciprocation of the cross head 121 of the punch press mechanism. After the punch press mechanism has thus been supplied with the metallic binding elements to be attached to the cordage 21 and individual conductors 23, 24 and 25, supply reels 33 loaded with cordage having the individual conductors thrown out through its braid cover 22 at intervals may be mounted upon the reel stands 34 and power may be supplied to the motors 53 and 116 to drive the turret 45 and fly wheel 118, respectively. As the turret 45 rotates about the main bearing post 44, it will carry the switch actuating arms 64 into engagement with the fixed abutment member 63 in automatic succession. Each time one of the switch actuating arms 64 engages the fixed abutment member 63, the motor 71 associated with that switch actuator arm 64 will be started in operation due to the completion of the circuit from the source of current 62 (Fig. 2) through the commutator rings 60 and 61 and contact 66 of switch 59. When the switch 59 is operated by its actuating arm 64, contact 65 of switch 59 will complete a circuit to energize holding relay 74 over a circuit from commutator ring 61 through the winding of the holding relay 74 and switch 75 back to the commutator ring 60. Thus, the motor 71 (Fig. 4) will continue to withdraw cordage 21 from the reel 33 and feed it down into the trough or pan 140 until the looped conductors 23, 24 and 25 extending through the braid cover 22 engage the forked actuator arm 76 of switch 75. When switch 75 is operated by the conductors extending out through the braid cover 22 on the cordage 21, the circuit to the holding relay 74 will be momentarily broken and contacts 65 and 66 will open. The motor 71 will, however, overrun slightly to feed the cordage from the position where the looped conductors engage the forked switch actuator arm 76 down to approximately the middle of the cord supporting plate 78. If insufficient cordage is fed beyond the feed rolls 72 and 73, the operator may manually advance the cordage to properly position it over the plate 78 and after the cordage is thus fed down to position to be worked upon, the braid cover 22 may be severed in any suitable manner and the individually insulated conductors 23, 24 and 25 and the cordage, at the point where the braid cover 22 is cut, may be properly aligned on locating pins 135 to 139 and 141 to 145, as shown in Fig. 6, where the cordage and conductors will be positioned to receive the S-hooks 27, stay bands 28 and terminal members 26.

The turret 45 rotates continuously and the operation of placing the individually insulated conductors and cordage on the positioning pins or locating pins 78 takes place while the turret is rotating and, as the turret 45 rotates, it will carry the framework 85, on which the cord supporting plate 78 is mounted, into the punch press portion of the apparatus, where the framework 85 will be blocked against moving with the turret 45 by the stop lever 104. As the framework 85 engages the stop lever 104, it will also operate the switch 112, thus to energize the clutch tripping solenoid 114 and initiate a cycle of operation of the punch press. In the operation of the punch press, the eccentric 119 will, through the pitman 120 and cross head 121, move the tool supporting block 122 to the left (Figs. 1, 3, 4, 8, 9, 10 and 11). As the tool supporting block 122 moves to the left in its ways 123 and 124, the stripper plate 186 will be moved to the left to engage the bumper pads 230 with the cord supporting plate 78. Since the springs 90 are appreciably stronger than the springs 188, the stripper plate 186 will be held stationary for a short time while the tool supporting block 22 continues to move to the left, thus to shear a stay band 28 and an S-hook 27 from the interconnected strips of stay bands 194 and S-hooks 192 and transfer these members into engagement with the cordage 21. As soon as this transference of the S-hook 27 and stay bands 28 from their interconnected strips to the cordage by means of the tools 181 and 182, in cooperation with the stripper plate 186, is completed, the left-hand face of the tool holder 180 will engage the right hand face of the stripper plate 186 and positively move it to the left (Figs. 8, 9, 10 and 11), thus to compress the springs 88 and engage the S-hook 27, which has been sheared from an interconnected strip, with the tool 164 which, in cooperation with the tool 181, will clamp the S-hook onto the cordage 21. Simultaneously with the attachment of the S-hook 27 to the cordage 21, the stay band 28 sheared from its interconnected strip of stay bands 194 will be attached to the cordage 21 by means of the tools 170 and 182. At the same time that the tools 164, 181, 170 and 182 are operating on the S-hook and stay band, the tools 168, 183, 169 and 184 will operate on the terminal members 26 to clamp them to the individually insulated conductors 23, 24 and 25 and the punches 172 will cut the terminals 26 apart through cooperation with the die member 185. Also simultaneously with the shearing of the terminal members 26 from their interconnected strip of terminal members 193, the conductor cutting tools 173 will be effective to cut the individually insulated conductors against the surface of the terminal members 26. In this manner, the S-hooks, stay bands and terminal members will be attached to the cordage and conductors of the cordage to form a complete cord for each cycle of operation of the punch press and the punch press will operate on each of the lengths of cordage 21 supported by a plate 78.

When the stop lever 104 blocks the movement of a framework 85 at the punch press portion of the apparatus, the framework will be held stationary while the turret 45 continues to rotate and the springs 101 and 102 will be compressed and will return the plate 78 and framework 85 to the normal position, as shown in Fig. 1, after the stop lever 104 is moved out of blocking arrangement with the framework 85. The lever 104 is moved out of blocking engagement with the framework 85 near the end of the cycle of the punch press due to the rocking of the bell crank lever 107 through the action of the cam 125 and cam roller 126, which will move the link 106 to the left and move the blocking lever 104 out of the path of the framework 85.

What is claimed is:

1. In a cord manufacturing apparatus, a rotatable member having plates thereon for positioning cordage to be processed, means for rotating the turret to carry the plates to a processing position, means for supporting a separate supply of cordage adjacent each plate, and means operable under the control of the cordage for feeding a length of cordage to association with a plate from the supply associated with said plate.

2. In a cord manufacturing apparatus, a rotatable turret, a plurality of supply reels carried by said turret, a plurality of cord positioning plates, one associated with each reel, means associated with each reel and plate for withdrawing material from the reel to association with the plate, and means individual to each reel and operable under control of material drawn therefrom for interrupting the operation of the withdrawing means.

3. In a cord manufacturing apparatus, a rotatable turret, a plurality of supply reels carried by said turret, a plurality of cord positioning plates, one associated with each reel, means associated with each reel and plate for withdrawing material from the reel to association with the plate, means individual to each reel and operable under control of material drawn therefrom for interrupting the operation of the withdrawing means, and a common control means for initiating operation of each withdrawing means.

4. In a cord manufacturing apparatus, a rotatable turret, a plurality of supply reels mounted on said turret, a plurality of positioning plates slidably mounted on said turret in position to receive material from a reel, means associated with each reel and plate for withdrawing the material from the reel to association with the plate, and means individual to each reel operable under control of material drawn therefrom for interrupting the operation of the withdrawing means.

5. In a cord manufacturing apparatus, a rotatable turret, a processing mechanism positioned adjacent the path of rotation of the turret, a plurality of cord supporting plates carried by the turret into the processing mechanism, a plurality of reels carried by said turret in substantial alignment with the plates, and means controlled by material withdrawn from the reel for feeding a predetermined length of material from the reel to association with a plate.

6. In a cord manufacturing apparatus, a rotatable turret, a plurality of cordage positioning plates carried by the turret, a supply reel carried by the turret for each of the plates, means for intermittently feeding lengths of cordage from the supply reels to the plates means for cooperating with said plates for attaching metallic elements to the cordage, and means also cooperating with the plates for attaching terminal members to the individual conductors of the cordage.

7. In an apparatus for forming cords from multi-conductor cordage having the inividual conductors thrown out through its csovering at intervals comprising a plurality of supply reels having cordage thereon, means for carrying said supply reels in a predetermined path, cordage feeding means individual to each supply reel, and means controlled by the individual conductors in the cordage at the point where they are thrown out through the covering thereon for interrupting operation of the feeding means.

8. In an apparatus for forming cords from multi-connductor cordage having the individual conductors thrown out through its covering at intervals comprising a plurality of supply reels having cordage thereon, means for carrying said supply reels in a predetermined path, cordage feeding means individual to each supply reel, means controlled by the individual conductors in the cordage at the point where they are thrown out through the covering thereon for interrupting operation of the feeding means, and means carried by the means for moving the supply reels in a predetermied path for initiating operation of the feeding means.

9. In an apparatus for forming cords from multi-conductor cordage having the individual conductors thrown out through its covering at intervals comprising a plurality of supply reels having cordage thereon, means for carrying said supply reels in a predetermined path, cordage feeding means individual to each supply reel, means controlled by the individual conductors in the cordage at the point where they are thrown out through the covering thereon for interrupting operation of the feeding means, and means carried by the means for moving the supply reels in a predetermined path for initiating operation of the feeding means in automatic succession.

ROBERT T. ADAMS.
JULIUS A. WAGNER.

REFERENCES CITED

The following references are of record in the file of this patent:

UNITED STATES PATENTS

| Number | Name | Date |
| --- | --- | --- |
| 1,853,020 | Page | Apr. 5, 1932 |